United States Patent [19]
Shoji et al.

[11] Patent Number: 5,626,985
[45] Date of Patent: May 6, 1997

[54] NONAQUEOUS ELECTROLYTE BATTERY

[75] Inventors: Yoshihiro Shoji, Hirakata; Mayumi Uehara, Ukyo-Ku; Koji Nishio, Hirakata; Toshihiko Saito, Mihara-gun, all of Japan

[73] Assignee: Sanyo Electric Co., Ltd., Osaka, Japan

[21] Appl. No.: 519,520

[22] Filed: Aug. 25, 1995

[30] Foreign Application Priority Data

Aug. 25, 1994 [JP] Japan .................... 6-225926

[51] Int. Cl.$^6$ .................................... H01M 6/14
[52] U.S. Cl. .................... 429/197; 429/198; 429/218
[58] Field of Search .................... 429/194, 196, 429/197, 198, 218

[56] References Cited

U.S. PATENT DOCUMENTS

| | | | |
|---|---|---|---|
| 5,108,855 | 4/1992 | Daifuku et al. | 429/191 |
| 5,112,704 | 5/1992 | Furukawa et al. | 429/194 |
| 5,192,629 | 3/1993 | Guyomard et al. | 429/197 |
| 5,472,808 | 12/1995 | Peled et al. | 429/192 |
| 5,478,671 | 12/1995 | Idota | 429/194 |
| 5,478,673 | 12/1995 | Funatsu | 429/197 |

FOREIGN PATENT DOCUMENTS 490048  6/1992  European Pat. Off. ....... H01M 10/40

*Primary Examiner*—Stephen Kalafut
*Assistant Examiner*—Jonathan S. Krueger
*Attorney, Agent, or Firm*—Birch, Stewart, Kolasch & Birch, LLP

[57] ABSTRACT

A nonaqueous electrolyte battery comprising a positive electrode, a negative electrode having lithium as an active material, a nonaqueous electrolyte comprising a solute and a solvent, and a separator. The solvent is a mixed solvent consisting essentially of 5 to 50% by volume of cyclic carbonate, 5 to 50% by volume of chain carbonate and 40 to 80% by volume of ether. The mixed solvent of a specific composition is less likely to cause undesirable surface layer formation on the negative electrode so that the electric resistance of the interface between the negative electrode and nonaqueous electrolyte is kept small. The nonaqueous electrolyte battery of the invention can therefore deliver a large amount of current and provide a high discharge capacity at low temperatures.

6 Claims, 2 Drawing Sheets

NONAQUEOUS ELECTROLYTE BATTERY

BACKGROUND OF THE INVENTION

This application claims the priority of Japanese Patent Application No. 6-225926 filed on Aug. 25, 1994 which is incorporated herein by reference.

1. Field of the Invention

The present invention relates generally to a nonaqueous electrolyte battery comprising a negative electrode having lithium as an active material and, more particularly, to an improved nonaqueous electrolyte for improving low-temperature discharge characteristics of the battery.

2. Description of the Prior Art

A nonaqueous electrolyte conventionally used for a nonaqueous electrolyte battery comprising a negative electrode having lithium as an active material contains, for example, such kind of solute as lithium tetrafluoroborate ($LiBF_4$) or lithium perchlorate ($LiClO_4$) dissolved in a mixed solvent consisting essentially of a relatively high-boiling solvent such as propylene carbonate, γ-butyrolactone or sulfolane and a relatively low-boiling solvent such as 1,2-dimethoxyethane or tetrahydrofuran.

A major drawback of conventional nonaqueous electrolytes of that kind is that they are apt to react with negative electrode materials resulting in undesirable surface layer formation on the negative electrode which increases the electric resistance of the interface between the negative electrode and nonaqueous electrolyte. For this reason, conventional nonaqueous electrolyte batteries have posed such a problem that it is difficult to withdraw a large amount of current at low temperatures and their low-temperature discharge capacities are low.

Having intensively studied this problem, we, the inventors, have discovered that the reaction between a nonaqueous electrolyte and negative electrode materials can be suppressed by use of a mixed solvent having a specific composition in the nonaqueous electrolyte.

SUMMARY OF THE INVENTION

The present invention has been made to overcome the aforementioned problem of the prior art. Accordingly, it is an object of the invention to provide a nonaqueous electrolyte battery having a high discharge capacity at low temperatures by employing a mixed solvent of a specific composition, which is not liable to react with a negative electrode having lithium as an active material, for use in a nonaqueous electrolyte.

A nonaqueous electrolyte battery according to the invention comprises a positive electrode, a negative electrode having lithium as an active material, a nonaqueous electrolyte comprising a solute and a solvent, and a separator, the solvent being a mixed solvent consisting essentially of 5 to 50% by volume of cyclic carbonate, 5 to 50% by volume of chain carbonate and 40 to 80% by volume of ether.

The cyclic carbonate may be ethylene carbonate (EC), propylene carbonate (PC), butylene carbonate (BC) or a mixture of at least two of these carbonates.

The chain carbonate may be diethyl carbonate (DEC), dimethyl carbonate (DMC), ethyl methyl carbonate (EMC) or a mixture of at least two of these carbonates.

The ether may be 1,2-dimethoxyethane (DME), 1,2-diethoxyethane (DEE), tetrahydrofuran (THF), 2-methyltetrahydrofuran (2Me-THF), 1,3-dioxolane (DOXL) or a mixture of at least two of these ethers.

The solute may be lithium trifluoromethanesulfonate ($LiCF_3SO_3$), lithium hexafluorophosphate ($LiPF_6$), lithium tetrafluoroborate ($LiBF_4$), lithium perchlorate ($LiClO_4$) or lithium trifluoromethanesulfonimide ($LiN(CF_3SO_2)_2$). Among them, lithium trifluoromethanesulfonate ($LiCF_3SO_3$) is particularly preferable in order to produce a nonaqueous electrolyte battery providing a superior discharge capacity at low temperatures.

The negative electrode may be made of any material that can absorb and desorb lithium ion or metallic lithium. Examples of materials that can absorb and desorb lithium ion are lithium-aluminum alloy, lithium-tin alloy, lithium-lead alloy and like lithium alloys, as well as metallic oxides such as $Fe_2O_3$, $Nb_2O_3$ and $WO_3$ and carbon materials such as graphite and coke.

The most remarkable feature of the invention is that it employs a nonaqueous electrolyte of such a composition that will not easily react with the negative electrode containing lithium as an active material, in order to reduce the electric resistance of the interface between the negative electrode and nonaqueous electrolyte. This, however, does not imply any limitations to the choice of materials other than the negative electrode and nonaqueous electrolyte materials that constitute a battery.

The positive electrode, for instance, may contain any prior art materials known in the production of nonaqueous electrolyte batteries. Examples of such materials are manganese dioxide, lithium-containing oxidized manganese material, lithium-containing oxidized nickel material, lithium-containing oxidized cobalt material, and lithium-containing composite oxidized metallic material comprising two or more of manganese, nickel and cobalt.

Containing a mixed solvent of a specific composition that is not liable to react with negative electrode materials, the nonaqueous electrolyte of the invention is less likely to cause surface layer formation on the negative electrode. With this arrangement, it is possible to obtain a low-resistance interface between the negative electrode and nonaqueous electrolyte. The nonaqueous electrolyte battery thus produced can deliver a large amount of current at low temperatures and provide an increased low-temperature discharge capacity.

Having now summarized the invention, other objects, features and advantages thereof will become more apparent upon reading the detailed description of the preferred embodiments to follow in conjunction with the accompanying drawings.

DETAILED DESCRIPTION OF THE PREFERRED EMBODIMENTS

Figure 1:
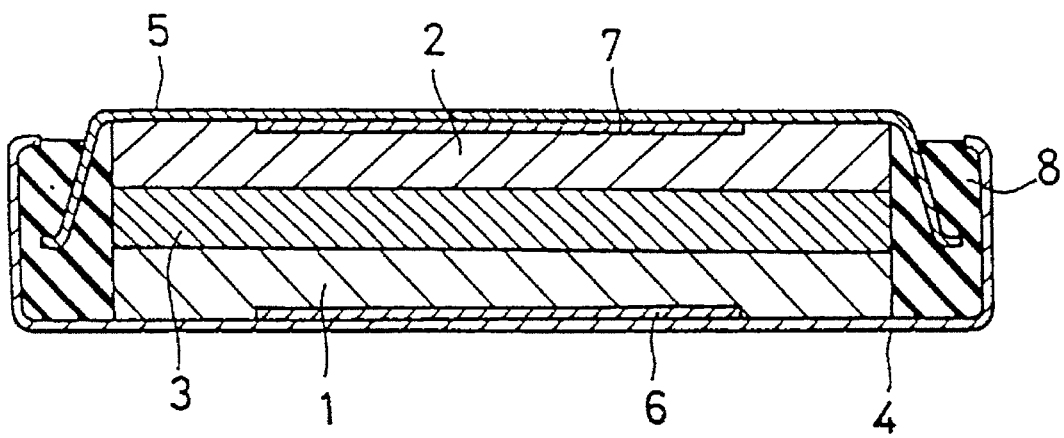
FIG. 1 is a cross-sectional view of a flat-type nonaqueous electrolyte battery according to an embodiment of the invention.

The invention will now be described in detail with reference to its preferred embodiments.

1. Production of Positive Electrodes

A positive electrode composite material was prepared by mixing manganese dioxide ($MnO_2$) to serve as a positive electrode active material, carbon powder as a conductive material and fluororesin as a binder in a ratio of 80:10:10 by weight. Thus produced positive electrode composite was laid on a positive electrode collector and pressure-molded to form a disc-shaped positive electrode. The positive electrode collector was made of a stainless steel plate (SUS304).

2. Production of Negative Electrodes

Metallic lithium-based negative electrodes were produced by punching a rolled lithium plate into discs of a specific size.

3. Preparation of Nonaqueous Electrolytes

Twenty-two kinds of nonaqueous electrolytes were prepared by employing various combinations of solutes and mixed solvents as shown in Table 1, each having a concentration of 1 mole/liter. Mixed solvents prepared for batteries of the present invention all contained cyclic carbonate, chain carbonate and ether mixed in a volume ratio of 1:1:3. Also, mixed solvents prepared for comparative batteries all contained the same in a volume ratio of 1:1:3 (DME).

trode 1, a negative electrode 2, a separator 3 for separating the two electrodes 1 and 2 from each other, a positive electrode can 4, a negative electrode can 5, a positive electrode collector 6, a negative electrode collector 7 and an insulating seal member 8 made of polypropylene.

The positive and negative electrodes 1 and 2, facing each other with the separator 3 impregnated with a nonaqueous electrolyte in between, are housed in a battery case formed by the positive and negative electrode cans 4 and 5. The positive electrode 1 is connected to the positive electrode can 4 via the positive electrode collector 6 while the negative electrode 2 is connected to the negative electrode can 5 via the negative electrode collector 7, so that chemical energy generated in battery A can be taken out in the form of electric energy from the positive and negative electrode cans 4 and 5 which serve as positive and negative terminals.

5. Low-temperature Discharge Characteristics of Individual Batteries

TABLE 1

| Battery | Nonaqueous electrolyte | | Discharge capacity (mAh) (on 1k · Ω constant resistance at −20° C.) |
|---|---|---|---|
| | Solvent | Solute | |
| A1 | EC + DEC + DME | LiCF$_3$SO$_3$ | 125 |
| A2 | PC + DEC + DME | LiCF$_3$SO$_3$ | 109 |
| A3 | BC + DEC + DME | LiCF$_3$SO$_3$ | 108 |
| A4 | EC + DMC + DME | LiCF$_3$SO$_3$ | 108 |
| A5 | EC + EMC + DME | LiCF$_3$SO$_3$ | 107 |
| A6 | EC + DEC + DME | LiPF$_6$ | 119 |
| A7 | PC + DEC + DME | LiBF$_4$ | 118 |
| A8 | BC + DEC + DME | LiClO$_4$ | 103 |
| A9 | EC + DEC + DME | LiN(CF$_3$SO$_2$)$_2$ | 106 |
| A10 | EC + DMC + DME | LiCF$_3$SO$_3$ | 125 |
| A11 | EC + DMC + DME | LiPF$_6$ | 114 |
| A12 | EC + DMC + DME | LiBF$_4$ | 112 |
| A13 | EC + DMC + DME | LiClO$_4$ | 105 |
| A14 | EC + DMC + DME | LiN(CF$_3$SO$_2$)$_2$ | 101 |
| A15 | EC + DEC + DEE | LiCF$_3$SO$_3$ | 123 |
| A16 | EC + DEC + THF | LiCF$_3$SO$_3$ | 115 |
| A17 | EC + DEC + 2Me-THF | LiCF$_3$SO$_3$ | 111 |
| A18 | EC + DEC + DOXL | LiCF$_3$SO$_3$ | 109 |
| B1 | γ-BL + DEC + DME | LiCF$_3$SO$_3$ | 55 |
| B2 | SL + DEC + DME | LiCF$_3$SO$_3$ | 21 |
| B3 | EC + γ-BL + DME | LiCF$_3$SO$_3$ | 19 |
| B4 | EC + SL + DME | LiCF$_3$SO$_3$ | 9 |

EC: Ethylene carbonate
DEC: Diethyl carbonate
DMC: Dimethyl carbonate
PC: Propylene carbonate
BC: 1,2-butylene carbonate
γ-BL: γ-butyrolactone
SL: Sulfolane
DME: 1,2-dimethoxyethane
THF: tetrahydrofuran
2Me-THF: 2-methyltetrahydrofuran
DOXL: 1,3-dioxolane
EMC: Ethyl methyl carbonate 4. Assembly of Batteries Flat-type nonaqueous electrolyte batteries A1 to A18 according to the invention and B1 to B4 for comparison were produced by using the aforementioned positive and negative electrodes and electrolytes. Measuring 20 mm in outside diameter and 2.5 mm in thickness, these batteries differed only in the composition of their electrolyte materials. A polypropylene microporous film having permeability to ion was used as a separator, which was impregnated with the aforementioned nonaqueous electrolytes.

FIG. 1 is a cross-sectional view illustrating the construction of each nonaqueous electrolyte battery A assembled in accordance with the invention. As shown in FIG. 1, each nonaqueous electrolyte battery A comprises a positive elec- Connected to a 1-k·Ω load, the individual batteries were subjected to a constant-resistance discharge test at −20° C. to determine their discharge capacities to an end-point voltage of 2.0 V. Test results are shown in Table 1.

As seen from Table 1, the batteries A1 to A18 of the present invention demonstrated high discharge capacities of not less than 100 mAh while the comparative batteries B1 to B4 gave low discharge capacities of less than 60 mAh. It will therefore be appreciated that the low-temperature discharge capacity of a nonaqueous electrolyte battery can significantly be increased by use of mixed solvents having such compositions as specified in this invention.

Based on comparisons between the batteries A1 and A6–A9, and between A10 and A11–A14, of the present invention, it is recognized that lithium trifluoromethanesulfonate ($LiCF_3SO_3$) is particularly preferable as a solute of a nonaqueous electrolyte in order to produce a battery having superior low-temperature discharge characteristics.

6. Relationship between the Ratio of Individual Solvents in a Mixed Solvent and Low-temperature Discharge Characteristics Lithium trifluoromethanesulfonate ($LiCF_3SO_3$) was dissolved in a concentration of 1 mole/litter in ethylene carbonate (EC), diethyl carbonate (DEC), 1,2-dimethoxyethane (DME) and in various mixtures thereof having different mixing ratios to prepare comparative nonaqueous electrolytes. Then, twenty-two kinds of nonaqueous electrolyte batteries were assembled using these nonaqueous electrolytes in otherwise the same assembly procedure as already described.

The nonaqueous electrolyte batteries thus prepared were subjected to a 1-k-$\Omega$ constant-resistance discharge test at $-20°$ C. to determine their discharge capacities to an endpoint voltage of 2.0 V. Test results are shown in FIG. 2.

Figure 2:
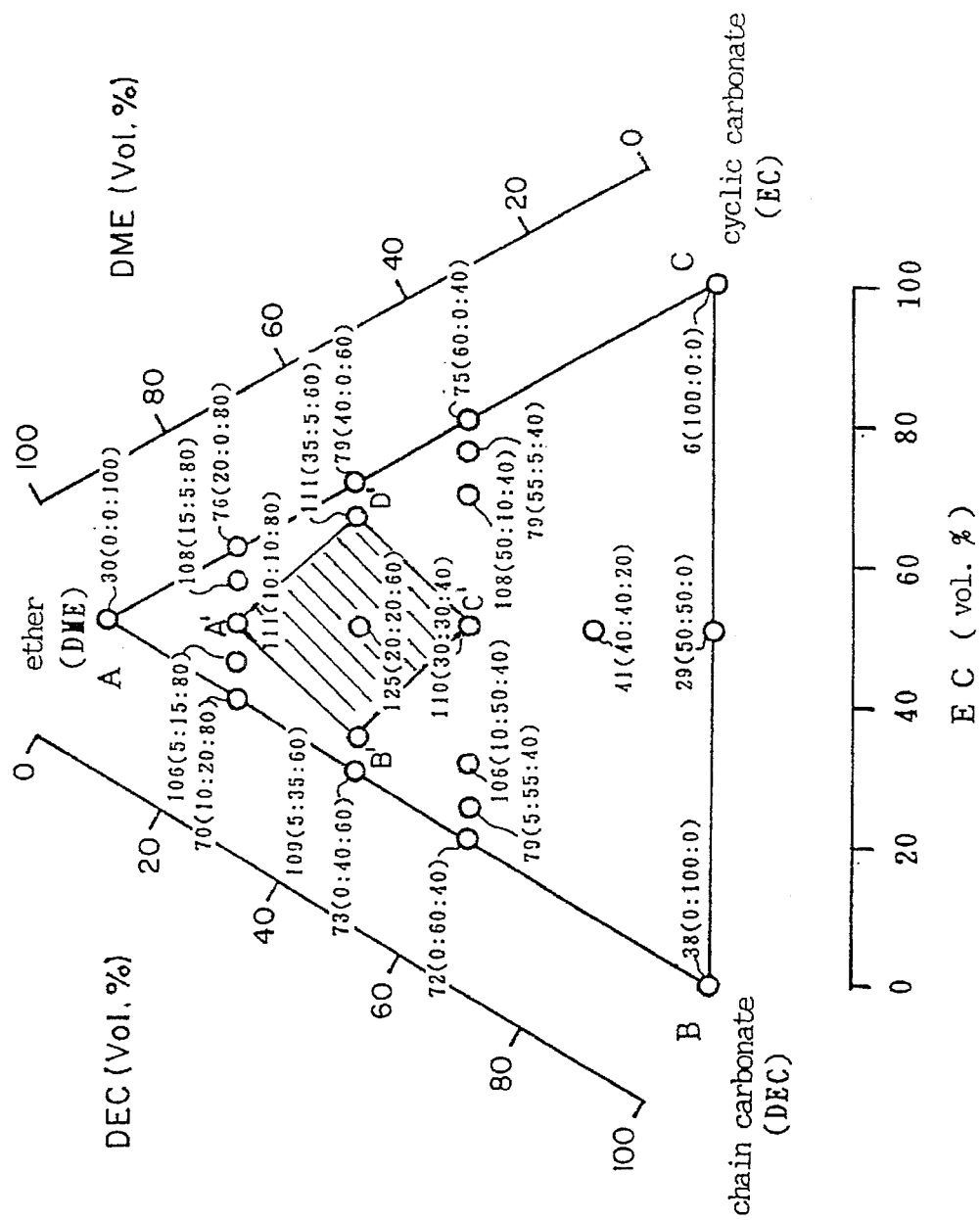
FIG. 2 is a triangular diagram showing the relationship between the ratio of individual solvents in a mixed solvent and the low-temperature discharge capacity.

FIG. 2 is a triangular diagram showing the compositions of the aforementioned mixed solvents, with volume ratios of their constituent solvents plotted along the sides of an equilateral triangle. Each plot, corresponding to a particular mixed solvent, is associated with a numeral indicating its low-temperature discharge capacity in mAh as well as a numerical representation of the mixing ratio of ethylene carbonate, diethyl carbonate and 1,2-dimethoxyethane in parentheses (EC:DEC:DME). In FIG. 2, the composition of each mixed solvent is given by those points at which the lines passing through the corresponding plot in parallel with line segments AB, BC and CA cut the individual sides of the triangle.

It is understood from FIG. 2 that a nonaqueous electrolyte battery having 2 remarkably high discharge capacity at low temperatures can be produced by using a mixed solvent containing 5 to 50% by volume of ethylene carbonate (EC), 5 to 50% by volume of diethyl carbonate (DEC) and 40 to 80% by volume of 1,2-dimethoxyethane (as shown by a hatched area on FIG. 2). Mixed solvents containing other kinds of cyclic carbonate, chain carbonate and ether were also tested and their test results have proved that a nonaqueous electrolyte battery offering a high discharge capacity at low temperatures is obtainable when the individual solvents are blended in the same ranges of mixing ratio.

Although the invention has been described as being embodied in flat-type nonaqueous electrolyte batteries, the invention is not limited to any specific shape of battery. It should be apparent to those skilled in the art that the invention is applicable without departing from the spirit and scope thereof to cylindrical, rectangular and various other shapes of nonaqueous electrolyte batteries.

What is claimed is:

1. A nonaqueous electrolyte battery comprising a positive electrode, a negative electrode having lithium as an active material, a nonaqueous electrolyte comprising a solute, a solvent, and a separator, said solvent being a mixed solvent consisting essentially of a cyclic carbonate, a chain carbonate and an ether in a ratio amount as defined by the hatched area of FIG. 2.

2. The nonaqueous electrolyte battery according to claim 1, wherein said cyclic carbonate is ethylene carbonate, propylene carbonate, butylene carbonate or a mixture of at least two of these carbonates.

3. The nonaqueous electrolyte battery according to claim 1, wherein said chain carbonate is diethyl carbonate, dimethyl carbonate, ethyl methyl carbonate or a mixture of at least two of these carbonates.

4. The nonaqueous electrolyte battery according to claim 1, wherein said ether is 1,2-dimethoxyethane, 1,2-diethoxyethane, tetrahydrofuran, 2-methyltetrahydrofuran, 1,3-dioxolane or a mixture of at least two of these ethers.

5. The nonaqueous electrolyte battery according to claim 1, wherein said solute is lithium trifluoromethanesulfonate.

6. The nonaqueous electrolyte battery according to claim 1, wherein said negative electrode contains lithium alloy, metallic oxide or carbon material.

* * * * *